INVENTORS
FREDRICK L. HILL
LAUREN W. GATES
BY
Owen, Wickersham & Erickson
ATTY.

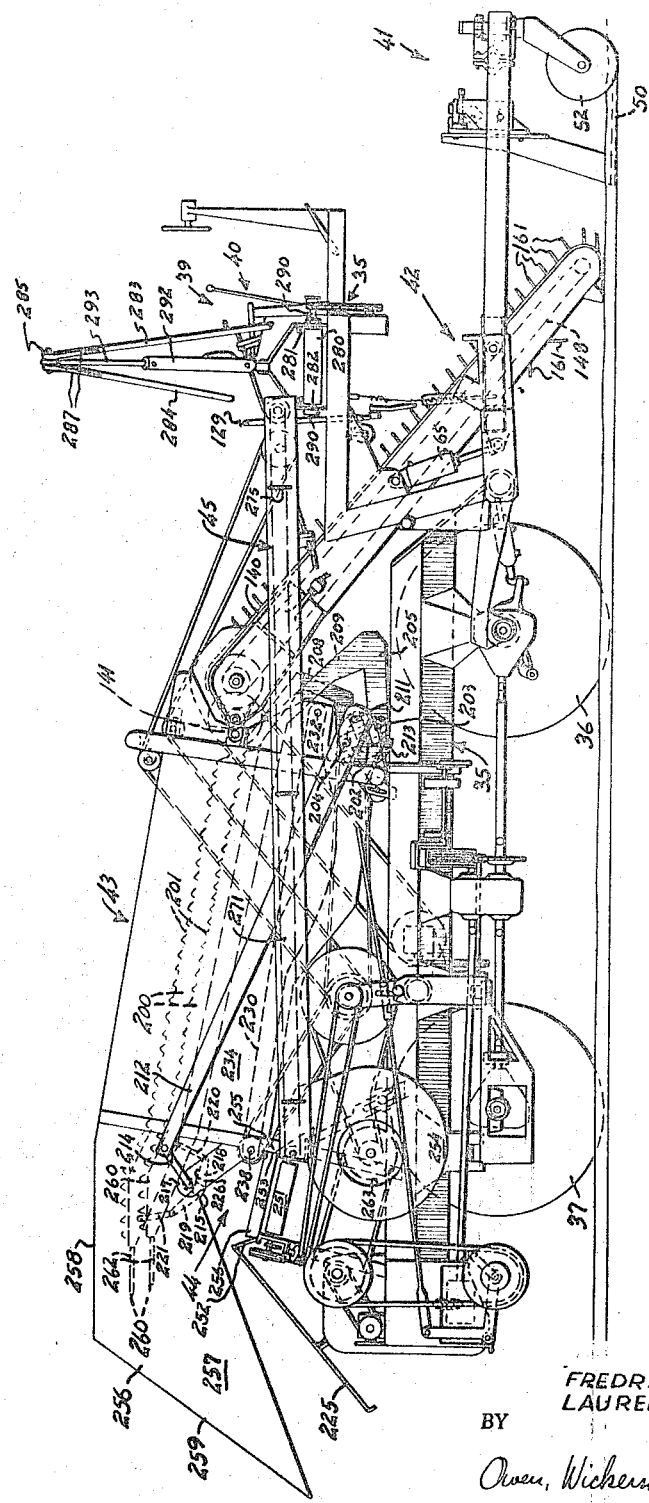

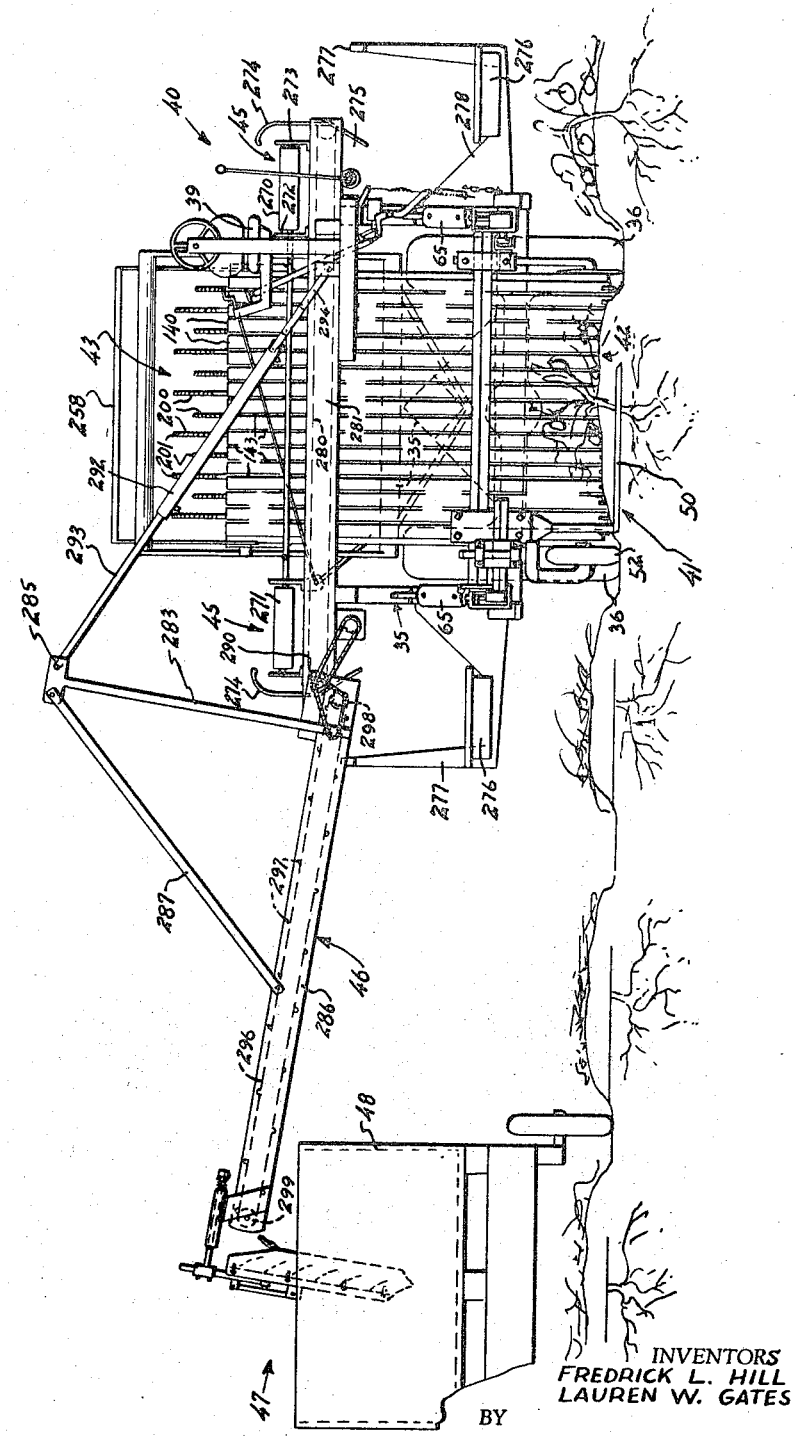

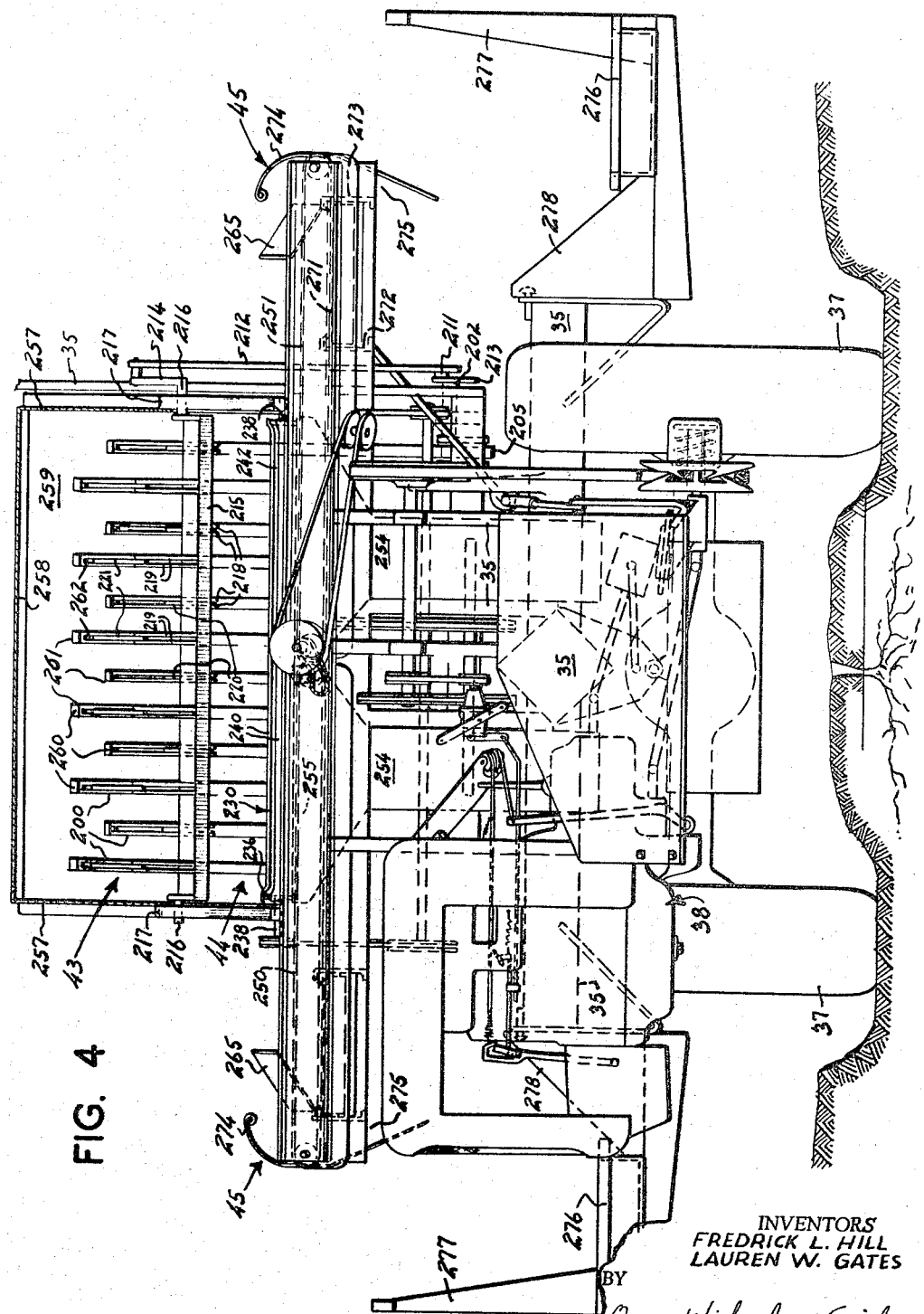

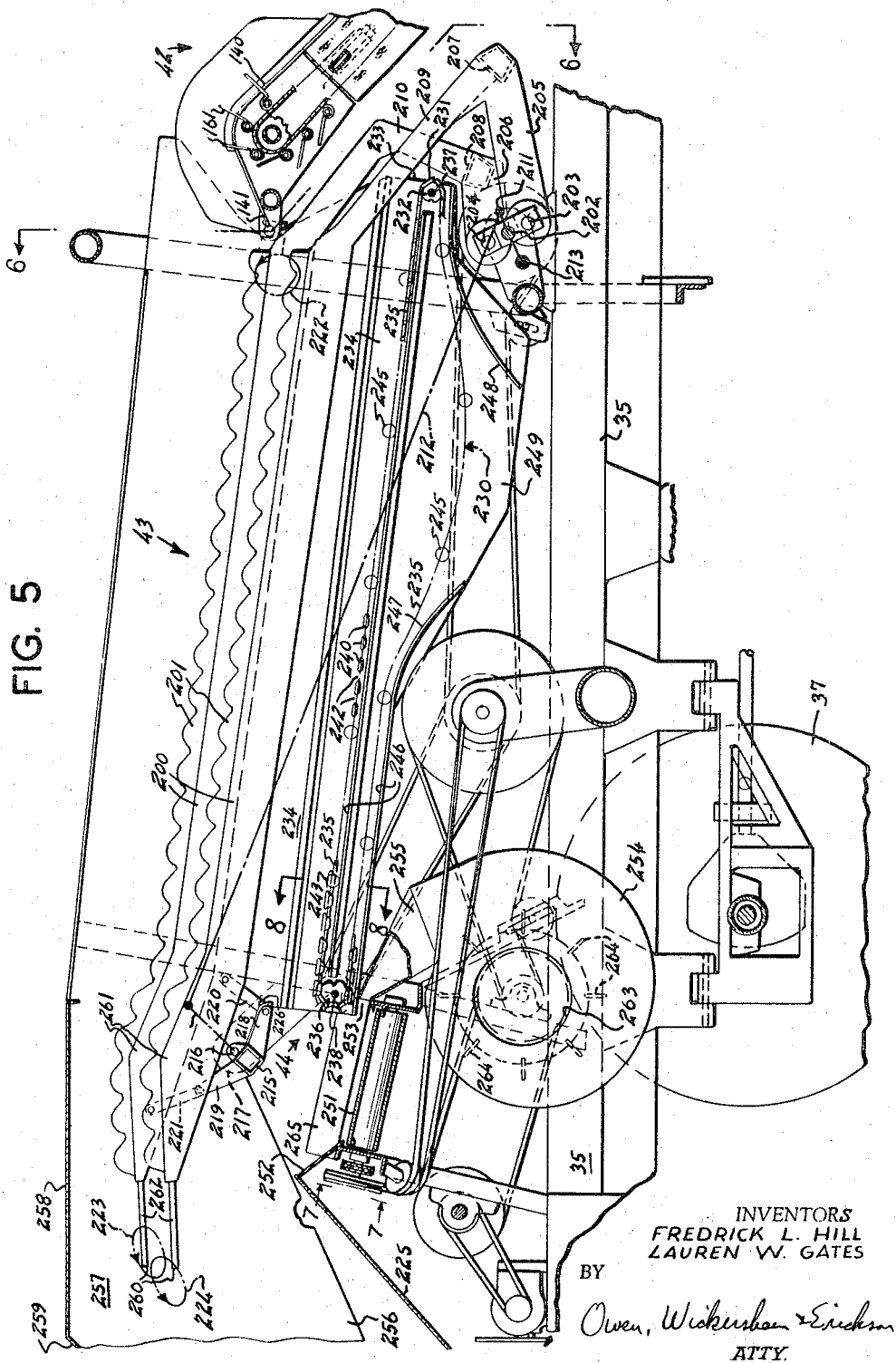

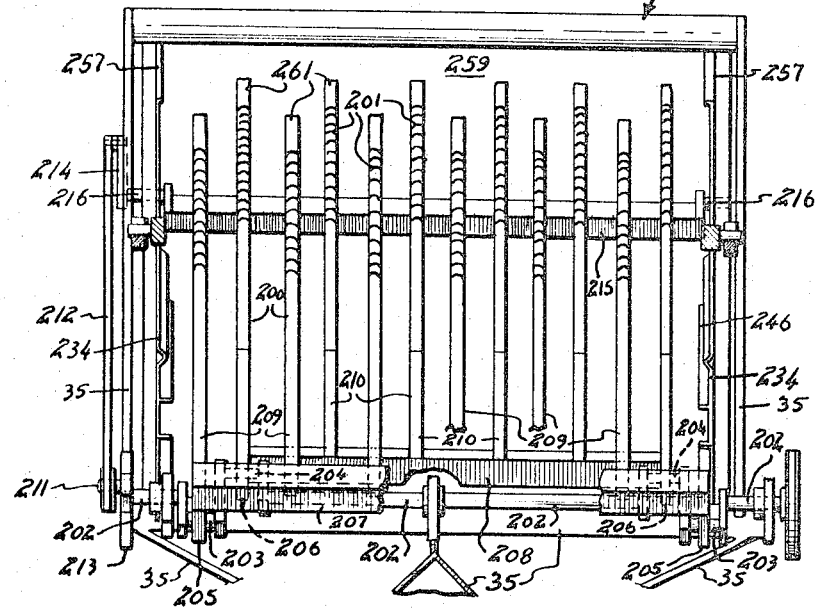
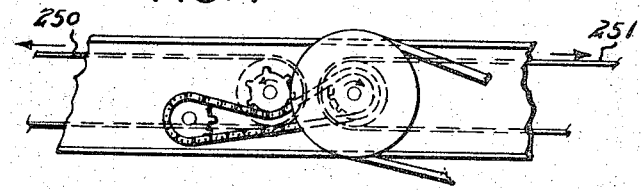

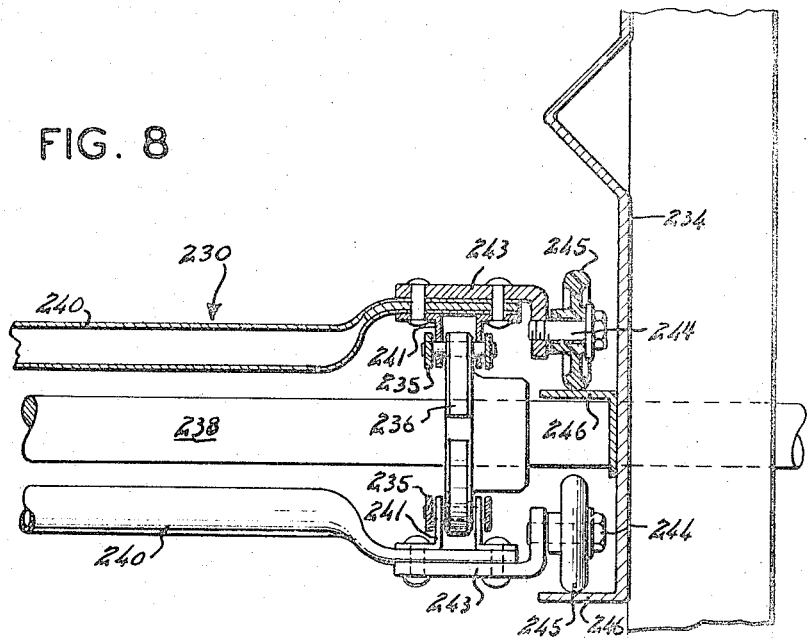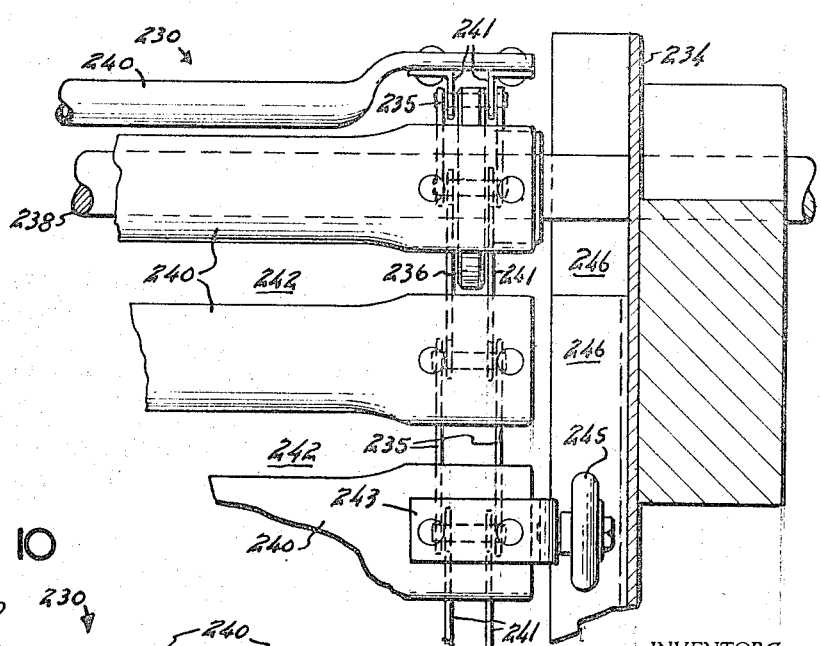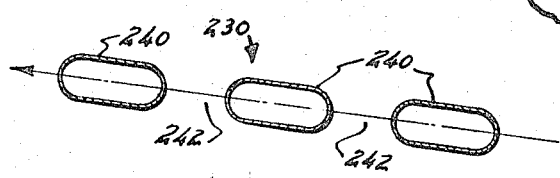

July 18, 1967
F. L. HILL ET AL
3,331,198
TOMATO HARVESTER
Original Filed Oct. 31, 1961
8 Sheets-Sheet 8
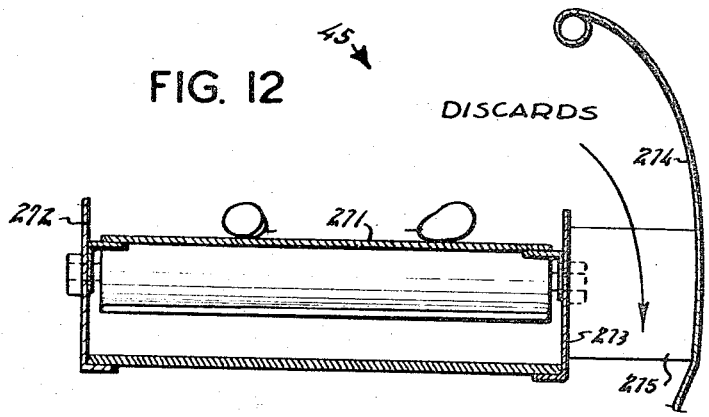
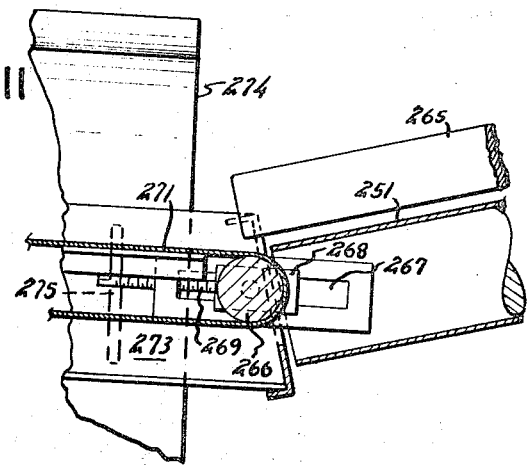
INVENTORS
FREDRICK L. HILL
LAUREN W. GATES
BY
Owen, Wickersham & Erickson
ATTY.

United States Patent Office 3,331,198
Patented July 18, 1967

3,331,198
TOMATO HARVESTER
Fredrick L. Hill, Rio Vista, and Lauren W. Gates, Stockton, Calif., assignors to The Regents of the University of California, Berkeley, Calif.
Original application Oct. 31, 1961, Ser. No. 148,963, now Patent No. 3,252,520, dated May 24, 1966. Divided and this application Feb. 28, 1966, Ser. No. 530,628
6 Claims. (Cl. 56—364)

This application is a division of application Ser. No. 148,963, filed Oct. 31, 1961, now Patent No. 3,252,520, issued May 24, 1966.

This invention relates to improvements in tomato harvesters. More particularly it relates to improvements in harvesters like that shown in U.S. patent application Ser. No. 59,031, filed Sept. 28, 1960, by Lorenzen, Ezluka, and Hill, now Patent No. 3,199,604, issued Aug. 10, 1965.

The present invention follows the basic teaching of that patent application in that it mechanically takes the whole vine up from the field and shakes the tomatoes off, separates the tomatoes from the leaves, dirt, and other matter, and provides for the sorting of the tomatoes and their loading into bins. Also like the invention disclosed in that application, in the present machine (a) a cutting device cuts the vine's main stem, preferably at root level; (b) a pickup device gently elevates the vine to a shaking device; (c) at the shaking device, rubber-covered walking bars mounted in two contrary-moving sets agitate the vine and advance it along the bars, while providing a gradually increasing shaking force as the vine moves from one end of the shaker to the other; (d) the vine is carried to the end of the shaking device and falls to the ground through an open chute; (e) the tomatoes removed by the shaker fall directly onto a conveyor, which carries them rearwardly; (f) certain devices remove dirt, leaves, and trash from the harvested tomatoes; (g) the tomatoes are cross-conveyed to sorting belts; (h) the tomatoes are visually sorted by hand as the sorting belts move them; (i) the sorted tomatoes are conveyed into containers, preferably located on a trailer being pulled parallel to the harvester; and (j) the tomatoes are then hauled away by trucks.

Leaves, dirt and debris were always problems in previous tomato harvesting. In this invention the conveyor that catches the tomatoes that fall through the shaker also has a structure that gets rid of most of the dirt and some debris, while a novel combination of blowers, the shaker, and certain conveyors, enables the device to clean out an astonishing amount of debris from the fruit, and improved novel transfer structures enable elimination of more of this material during transfer from the collecting conveyor to some cross conveyors.

Another feature of the invention is that the tomatoes carried to the rear of the shaker by the collecting conveyors and sent by cross-conveyor belts out to the sides, are transferred to forwardly moving conveyor belts that carry them past a sorting station located beside the shaker and the pickup, thereby substantially shortening the device and making it much more maneuverable than where the sorting station is located behind the shaker. Also a simplified conveyor system saves power and gives greater efficiency.

By locating the delivery means within the driver's view and providing controls for various elements, the driver is given a controlling position over the entire operation and can do much to improve the efficiency of the harvesting operation so that total crew size can be reduced.

Further explanation of each step and stage, together with exposition of the problems encountered, will be given in, and other objects and advantages of the invention will appear from, the following detailed description of a preferred embodiment of the invention.

In the drawings:

FIG. 1 is a top plan view of a tomato harvesting machine embodying the principles of the invention. The output conveyor is broken and its end portion set to one side. Some portions are broken away to show parts that are normally hidden from view.

FIG. 2 is a view in side elevation of the machine of FIG. 1 with the sorters' platform and the output conveyor omitted for the sake of clarity.

FIG. 3 is a front elevational view of the machine of FIG. 1.

FIG. 4 is an enlarged view in rear elevation of the machine.

FIG. 5 is a fragmentary view in side elevation and partly in section of the shaker unit and adjacent portions of the machine.

FIG. 6 is a view in vertical section taken along the line 6—6 in FIG. 5, showing the walking bars and their crankshaft, with some parts broken away to show other parts better.

FIG. 7 is a fragmentary view in rear elevation taken along the line 7—7 in FIG. 5 showing the drive for the cross conveyors at the rear of the shaker unit.

FIG. 8 is a fragmentary view in section taken along the line 8—8 in FIG. 5, of the conveyor onto which the shaker unit shakes the tomatoes.

FIG. 9 is a plan view of the elements of FIG. 8.

FIG. 10 is a side elevation diagram of the conveyor of FIGS. 8 and 9, with a dot-dash line indicating the tilt of the conveyor.

FIG. 11 is a fragmentary view in elevation and in section taken along the line 11—11 in FIG. 1, showing the transfer from a cross conveyor to a sorting conveyor.

FIG. 12 is a fragmentary view in elevation and in section of the sorting conveyor and discard chute, taken along the lines 12—12 of FIG. 1.

*Brief general description (FIGS. 1–4)*

Figure 1:
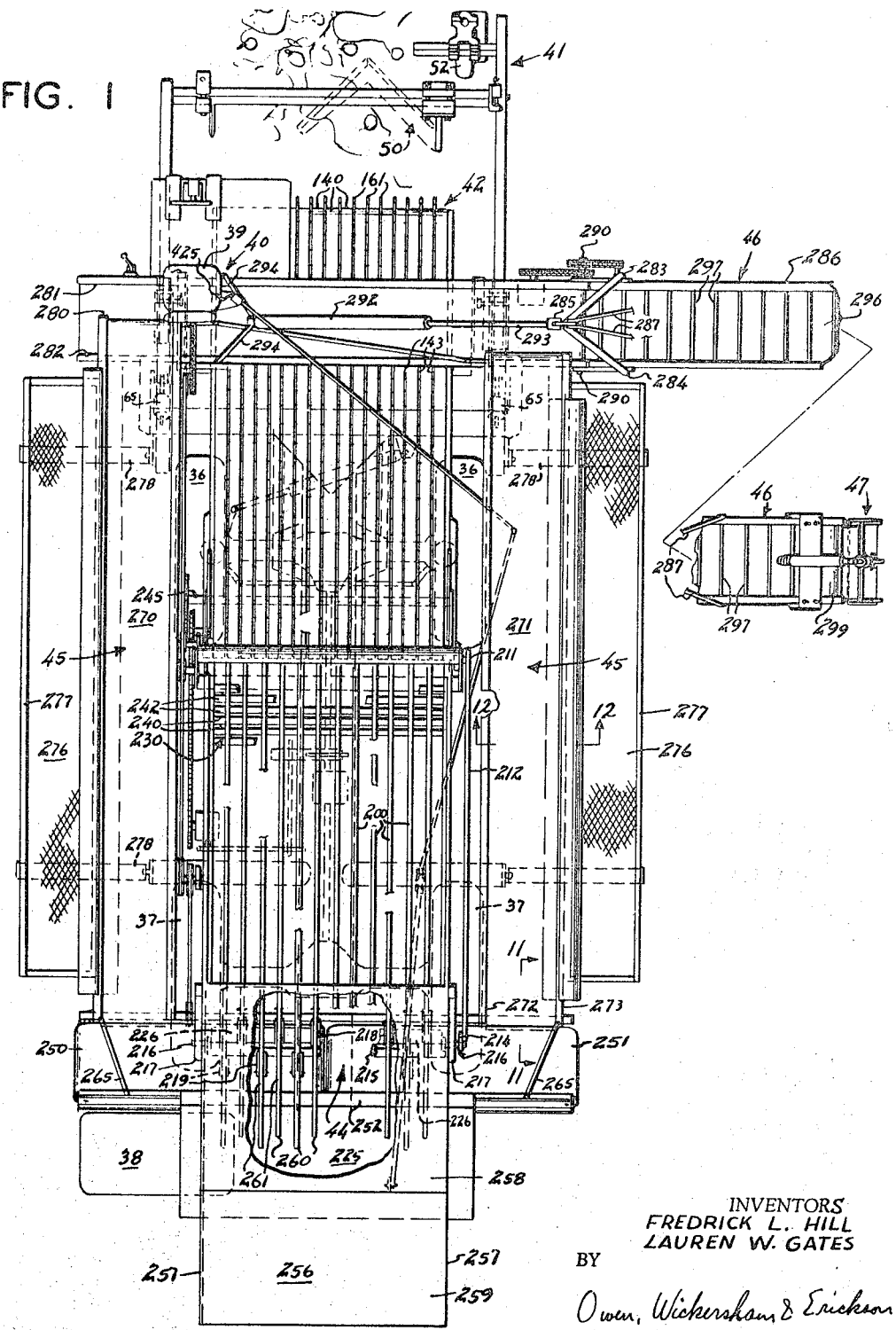

The drawings show a tomato harvester embodying the invention and having a main frame 35 supported on front wheels 36 and rear wheels 37. The frame 35 carries an engine or self-propelling means 38, a driver's seat 39, and driving and steering controls 40. The main frame 35 also supports a cutting means 41 at the front, a pickup and vine-lifting means 42 behind it, a shaking means 43 behind that, a de-leafing means 44 at the rear of the shaking means 43, sorting stations 45 alongside and outside the shaking means 43, an output conveyor 46 at the forward end of the sorting station 45, and a fruit-depositing device 47 at the outer end of the output conveyor 46. The device 47 places the harvested tomatoes into a bin 48 that is moved alongside the harvester.

At the forward end of the harvester is an assembly 41 for automatically cutting off each tomato plant in the path of the machine. The cut may be made at, below, or above the ground level, depending on the conditions encountered, but generally it will be below the ground, and the cut is made without shaking off or cutting into the tomatoes carried by the vine.

The pickup unit or vine elevator 42 raises the cut vine gently and in truly vertical lift, so that there is as little shaking as possible, and deposits the vine on the shaker 43. This vertical lift is accomplished by synchronization of the elevator 42 with the ground speed of the vehicle. Shaking in the lifting stage is to be avoided, as any tomatoes that come off the vine during lifting tend to roll down to the ground and be lost.

The elevator 42 is kept above ground where the vine alone is gently lifted, and the amount of dirt that gets on to the elevator 42 is much less than in other devices of this general nature.

The shaker 43 includes a plurality of vertical parallel walking bars 200 with an upwardly extending undulating resilient upper surface 201. The bars 200 are made to produce a walking action by a crankshaft 202 at their forward end. The crankshaft 202 has a pair of diametrically opposite crank pins 203 and 204. The pins 203 and 204 are at the forward end of the shaker 43, and have respective forwardly extending arms 205 and 206. The two arms 205 from the pins 203 are joined by a rigid base bar 207, and the two arms 206 are joined by a second base bar 208, the arms 205 and 206 being of different lengths so that the base bars 207 and 208 never touch during operation. The base bars 207 and 208 lie beyond the front end of the shaker 43 and beneath the elevator 42 at a position never reached by tomatoes, as will be seen. Every other walking bar 200 is joined to the base bar by a connecting web 209 while the remaining (alternate) walking bars 200 are joined by a web 210 to the base bar 208.

There is also, on the right-hand side of the machine, a crank 211 lying at right angles to the crank for the pins 203 and 204 and of the same length, and to this is pivotally secured a long pitman 212. A counterweight 213 for the shaft 202 has its center of gravity directly opposite the pitman pivot at the same distance from the crankshaft 202. The pitman 212 extends to nearly the rear end of the shaker 43 and is there joined pivotally to a crank arm 214. The crank arm 214 is rigidly joined to a box beam 215, which is pivotally supported by pivots 216 on extensions 217 of the main frame 35. Along its length the beam 215 has arms 218 and 219, which alternate, each arm 218 extending forwardly and being connected to an arm 200 by a link 220, while each arm 219 extends rearwardly and is connected to an arm 200 by a link 221. The arms 200 that are joined to the base beam 207 are connected to the arms 218 while the arms 200 that are joined to the base beam 208 are connected to the arms 219.

Thus, the single crankshaft 202 operates the entire walking operation of all the bars 200 and walks them in alternate pairs. The base beams 207 and 208 follow essentially circular paths and cause a point on the forward end of each bar 200 to follow a path like that shown in the curve 222. The pitman 212 causes the box beam 215 to rock back and forth and the combination of the pitman 212 and the connections to the bars 200 cause a point at the rear of a bar 200 to follow a path like those in the curves 223 and 224 in FIG. 5. The result is a shaking action that bounces the vines and shakes the tomatoes off the vine. The undulating surface 201 causes the vine to walk up the bars 200 until at their upper end the tomatoless vine falls down a slide 225 at the rear of the machine and drops on the ground. Although the walker-base-beam interconnection system translates on generally circular paths, these are adjustable, to enable more or less vertical amplitude at the rockshaft than at the crankshaft. The rear ends of the walkers may thus be made to describe slightly elliptical paths in which the major axis may lie in the line from the point in question to the crankshaft or may be at 90° thereto, depending upon whether the amplitude at 90° to that line (the amplitude which is adjustable) is less than or more than the constant amplitude along the line which contains the crankshaft.

The effectiveness of the walking bars 200 in removing fruit from the vines of any particular breed of tomato varies with the rotational speed of the crankshaft 202 as well as with its throw. The speed may be set to yield the optimum recovery of ripe fruit for any particular variety or size of vine and maintained at that speed, as will be shown later. For example, about 180 r.p.m. has worked well on some crops.

As shown in FIGS. 2 and 5, the arms 209 and 210 extend downwardly and forwardly of the walking bars 200, thereby enabling the elevator or pickup unit 42 to deposit the tomatoes on the front end of the bars 200 at about the level of the end of the slide portions 141 of the strips 140. There is no movement of the walking bars 200 through the gaps 143 and hence no entanglement of the vine at this transfer point. The device smoothly transfers the tomatoes, and there is no opportunity for tomatoes to roll back to the ground once they have reached the slides 141, for even if the tomatoes come off the vine after that point, so long as they have been carried up to the slides 141, they will fall down between the walking bars 200 and be collected with the rest of the fruit that falls off at the shaker 43.

The shaker 43 separates the fruit from most of the vine, and the tomatoes fall down onto a conveyor 230 which is located just below the lowest points reached by the walking bars 200, a distance just sufficient to prevent the walking bars 200 from hitting any tomatoes resting on the conveyor 230. The short fall from the bars 200 to the conveyor 230 helps to prevent damage to the tomatoes. The forward end 231 of the conveyor 230 goes around a sprocket wheel 232 (FIG. 5) which lies forward of the forward end of the walking bars 200, the rear end of the slides 141, and the crankshaft 202, so that any tomatoes which reach the slide and fall between the bars 200 will fall onto the conveyor 230. Moreover, the conveyor 230 is enclosed within a forward wall 233, which keeps tomatoes from rolling off the lower end of the conveyor 230, and side walls 234 that also help to hold the fruit on the conveyor 230.

Details of a preferred form of the collecting conveyor 230 are shown in FIGS. 8 through 10. There are two chains 235, one on each side of the conveyor 230 running around and between the sprocket wheel 232 and a rear sprocket wheel 236. A shaft 237 may connect the forward sprocket wheels 232, and a shaft 238 may connect the rear sprocket wheels 236, or both chains may be driven individually. Cross members 240 are attached to the chains 235 by means of brackets 241. The cross members 240 are preferably flattened tubular members which are wider than they are high, and they are spaced apart a distance that is closer than the diameter of the minimum size of tomatoes to be caught but far enough to enable passage of dirt and various debris through the conveyor 230. The spacing also enables the conveyor 230 to catch the tomatoes in the spaces 242 between succeeding cross members 240 and carry them up that way. To some of the cross members 240 are affixed brackets 243 which support stub shafts 244 on which are mounted rotatable rollers 245. The rollers 245, which preferably are of nylon, roll on rails 246 and support the weight of the conveyor 230 and the tomatoes on it, while the chains 235 merely advance and move the conveyor and do not have to provide any support function.

The conveyor 30 moves rearwardly and upwardly on the upper run, as shown in FIGS. 5 and 10, on a gentle slant, so as to hold the tomatoes against downhill rolling. On the lower run, there is a portion 247 where the track 246 moves down and a gap between that and a portion 248 where it comes up, leaving an opening 249 between them. Here the conveyor 230 is slack and its path drops, as shown in FIG. 5, thereby providing an automatic take-up of the chains 235 as they wear.

The upper surface 201 of the walking bar 200 is important. Instead of providing finger-like projections that are quickly worn away and that tend to damage tomatoes, the invention provides an undulating wide upper surface 201 of rubber, which advances the vines upwardly, as they could not be advanced by smooth walking bars, but does so without damage to the tomatoes and with considerably less wear on the bar surfaces 201.

Thus, it will be seen that the shaker 43 serves to advance the tomato vines rearwardly of the machine while shaking off tomatoes in a gradually increasing order of severity. The tomatoes fall down between walking bars 200 into an area that is unencumbered by other parts and land on the conveyor 230. There are no places on the conveyor 230 or between the conveyor 230 and the walking bars 200 which could damage the tomatoes, because the crankshaft 202 lies beneath the conveyor 230, and the bars 200 themselves are joined to the crankshaft 202 by the bars 209 and 210 which extend forward of the conveyor 202 without touching it. At the rear end of the device, a cover plate 226 covers the box beam 215 and prevents entanglement of the vines in the rocking device.

The conveyor 230 moves the tomatoes rearwardly and upwardly and drops them onto a pair of transfer or cross conveyors 250 and 251 (see FIG. 7) at the rear end of the shaker 43. The end of the conveyor 230 is spaced above the cross conveyors 250 and 251, although it somewhat overlaps them lengthwise. The conveyors 250 and 251 are slanted toward the front, that is, across their width, and are located closely adjacent to the slide 225, being joined to it by an upwardly extending slide portion 252.

The vertical gap 253 between the conveyor 230 and the cross conveyors 250 and 251 provides a space through which a strong current of air can be sent from a pair of blowers 254. The air coming from the blower is sent through nozzle-like outlets 225 at the gap 253 and passes through the stream of falling tomatoes as they drop from the conveyor 230 across the gap 253. The current of air is not sufficient to affect the tomatoes to any substantial degree, but it does pick up the lightweight particles of leaves and vines which have fallen down between the walking bars 200, have landed on the conveyor 230, and have not fallen out through the openings 242. The air current blows them up over the slide 252 onto the slide 225, whence they fall down with the vines and other particles that have been carried up over and fall off the rear end of the walking bars 200. The slide 225 is shielded somewhat by a shield 256 having side walls 257, a top wall 258, and a rear wall 259, and the shield 256 guides the current of air that passes from the blower 254 and through the gap 253. This helps to prevent any particles that fall from the ends 260 of the walking bars 200 from drifting back into the area over the conveyors 250 and 251 and falling on them. Also, the bars 200 have an upwardly slanted portion 261 carrying the vines above the current of air from the blower 254 onto terminal portions 262 extending out over the slide 225. Thus, the blower 254 keeps the area clear and also disposes of such debris as may remain on the conveyor 230 when it reaches the upper end of its run. The current of air is also effective even to pick up leaves and vine particles that have fallen onto the conveyors 250 and 251, although most of them never reach a quiescent state.

The blower 254 may be of the well-known vane type, in which there is an axial air inlet 263 and vanes 264 drive the air through a spiral path gradually increasing in diameter, by which the air passes to the outlet nozzle 255. The vanes 264 are driven by the engine 38.

The cross conveyors 250, 251 move outwardly from the center toward the sides and, as said before, are inclined toward the front. This inclination toward the front cooperates with diagonal guide members 265, and the combination is used to transfer the fruit from the cross conveyors 250 and 251 to the sorting conveyors 270 and 271 that extend forwardly along the sides of the shaker 43 and much of the pickup unit 42. The transfer is shown in FIGS. 1, 2, 4 and 11, where it will be seen that the tomatoes roll forwardly down the belt 250 or 251 and are guided by the member 265 onto the substantially horizontal sorting belts 270 and 271. The rear end rollers 266 of the sorting belts 270 and 271 are movable longitudinally within the loop surrounded by the belts 250, 251, as shown in FIG. 11, by means of an adjustment slot 267, block 268, and threaded member 269 to keep the belts 270 and 271 tight without interfering with the belts 250 and 251.

The sorting belts 270, 271 move within side frame members 272 and 273 that keep tomatoes from falling over the edges, the frame members 272 lying near the shaker 43, while the frame members 273 lie on the outside. Spaced away from the members 273 are fender-like members 274, the space between them providing a disposal chute 275.

The machine is provided with side platforms 276 having protecting rails 277 and attached to the frame 35 by suitable fastening means 278. The sorters stand on these platforms 276, protected by the rails 277 and watch the fruit as it passes over the belts 270 and 271. Whenever they find fruit which is green, scarred, or damaged so that it fails to meet the standard, they simply lift it and drop it down the chute or discard trough 275 between the fender 274 and the frame 273. It falls from there directly to the ground, where it does no harm. There may be up to seven sorters on each side and they work according to any predetermined plan which will be effective.

The forward ends of both sorting conveyors 270 and 271 spill their tomatoes gently onto a front cross conveyor 280, which extends laterally across the machine from one side to the other at approximately the same forward location as the driver's seat 34. The conveyor 280, which may be of the belt type or of an open mesh metal type for cleaver operation, lies between a pair of retaining walls 281, 282 and may be level. The fruit from the conveyor 270 is carried beyond the centerline of the conveyor 280 and falls onto the forward half of the conveyor 280, whence it moves across the machine, to join with it the fruit from the conveyor 271, which is spilled into the rear half of the conveyor 280, i.e., rear of the centerline. The conveyor 280 then conveys all the fruit onto the output conveyor 46.

The output conveyor 46 extends out to one side of the machine, is supported for adjustment in the height of its outboard end. A pair of generally vertical posts 283, 284 (FIGS. 1–3) extend up from a frame member 286 of the conveyor 46 and are joined together by a member 285. A pair of rigid members 287, one on each side of the conveyor frame 286, are pivoted to the frame 286, and the frame 286 itself is pivotally joined to the main frame 35 by a hinge 290 so that the height of its outer end can be adjusted during operation. The swinging is accomplished by means of an hydraulic device that includes a cylinder 292, a piston rod 293, and anchoring members 294 that are anchored to the main frame 35 on opposite sides of the cross conveyor frame members 280 and 281. A hydraulic conduit 295 extends up to the cylinder 292.

The conveyor 46 comprises a flighted belt 296 with cross members or flights 297 that enable upward movement of the tomatoes. The belt 296 is driven at the inboard end of its loop through a roller 298 and there is a roller 299 at its outboard end. At the outboard end, the tomatoes drop off the belt 296 into the fruit depositing device 47.

*Operation*

The harvester is self-propelled by its engine 38 driving all four wheels 36 and 37 with the operator at his control station 40 and provided with the usual steering and braking devices as well as the special mechanisms which have been described earlier. Once the machine has harvested one or more rows of tomatoes, it always moves beside the left-hand side of a harvested row. In other words, looking at FIG. 1, the portion still to be harvested would be on the left of the machine and the portion already harvested lies on the right. For the first row, of course, this is not feasible, but once that has been harvested, the pattern is begun. Often the machine will first harvest a row down approximately the middle of the field and a second row at one end of the field and then will move in a loop, with the machine moving forward to the left of already harvested adjacent rows.

As the machine approaches the field and moves along the highway, its output conveyor 46 is normally raised as high as possible to take up a minimum of room, and the depositing device 47 is normally taken off and carried along somewhere on the machine. The clutches are disengaged so that none of the conveyors, the blower 254, or the walking bars 200 are moving. The clutch for the pickup chains is also disengaged, and both the pickup unit 42 and the cutter unit 41 are elevated well above the road.

After the machine leaves the highway into the field to be harvested, the operator actuates a hydraulic cylinder 65 so as to lower the pickup unit 42 and the cutter unit 41 to their proper positions. The V-shaped knife 50 is lowered and, if necessary, is properly adjusted laterally and vertically with respect to its gauge wheel 52. The relative position desired between the cutting unit 41 and the elevator 42 is also determined; normally the knife blade 50 will be about three inches below the ground and the front end of the elevator unit 42 will be about two inches above the ground. At this time, the operator also uses the hydraulic cylinder 292 to erect the output conveyor 46 into the position shown in FIG. 3, and the fruit depositing device 47 is installed in place. The sorters take their places on the platform 276, and the operation is ready to commence.

With the engine set at a desired speed, the operator can now engage the clutches, and the chain 148 of the pickup unit 42 begins moving its tines 161 along their paths. The operator can turn a crank 425 to adjust the forward speed of the frame 35 and the backward speed of the chains 148 while leaving constant the speed of the conveyors and other constant-driven parts. As he then starts along the row, all the moving devices are driven by the engine 38 with the hydraulic devices ready for control by the operator as he needs them.

The machine moves along a row with its tires 36 and 37 in the furrows, while the bin 48 is moved by a separate tractor or suitable device, preferably two furrows away, as shown in FIG. 3. The harvester advances with the vertex of the blade 50 to the right of the trunk or main stem of the tomato plant, as shown in FIG. 1, so that the blade portion cuts the stems of the vines. As it moves below the ground, the blade 50 creates a ground swell, which subsides before the pickup unit 42 reaches that point, so that no dirt gets thrown on the pickup unit 42. As he moves along, the operator notes the proper blade height and elevator height and from time to time moves the pickup unit 42 up and down to the proper elevation. Because of the lost-motion connection between the units 41 and 42, he can do this without affecting the height of the blade 50. As the blade 50 cuts off the vine with its portion, any entanglement that might take place on the blade portion cannot occur, for the vine almost immediately passes off at the end of the blade 50. Since the vine is operating below ground, very little entanglement takes place with the blade portion, and such as does trails off at the end.

The pickup unit 42 engages the cut-off vine at about the point where the ground swell stops, or shortly thereafter. Its tines have their fingers 161 gradually moving to a position approximately parallel to the guide strips 140 as the fingers 161 approach the ground and then the fingers 161 swing until at the forward limit they lie horizontal. It is in this position that they generally pick up the vine and begin lifting it, gradually but slowly, to a forwardly and upwardly inclined position. The upward inclination enables them to be sure to pick up the vines; a perpendicular position at this time is not necessary and has a positive disadvantage in that too quick a shift of movement of the tines 160 could start shaking the vines somewhat. When so moved, the vine is lifted substantially vertically, because the backward speed of the tines 161 exactly balances the forward speed of the main frame 35 and therefore of the frame of the pickup unit 42; as far as the vine is concerned, it is simply being gently lifted vertically relative to the ground. As the vine is moved up and back along the pickup unit 42, the fingers 161 are gradually straightened up until by the time they reach the top, they are substantially perpendicular to the guide strips 140. At this point the vines are moved over to the slide portion 141 and they can then roll down the slide 141, being given some final pushes by the fingers 161 as they turn around at the top of their run. The fingers 161 are then carried down into the lower run and complete the rest of their turn so that they will be in position to again pick up the vines when they reach the lower end.

The vines slide down the slide 141, which is purposely tilted at a steep angle to encourage them to slide, and if any tomatoes fall off at this point, they too roll down the slide 141 so that there is no problem in collecting them. The slide 141 overhangs the shaker unit 43 and deposits the vines on the walking bars 200 at approximately no change in elevation when they fall off. ("Approximately" means that the walking bars 200 are constantly moving up and down; it is not a transfer to a still object but to a moving one.) The tomatoes that have fallen off during their passage down the slide 141 fall directly between the bars 200 and if they should hit the upper surface 201 of one of the bars 200, they are not damaged because it is elastomeric and has no sharp angles. When the tomatoes fall down between the bars 200, they meet no obstruction, but land on the conveyor 230 a very short distance below the bars 200, without a severe drop. If they should tend to roll down and forward after falling between the walking bars 200, they are caught by the front wall 233 and start moving up the conveyor 230, taking a position in between succeeding pairs of cross members 240. Dirt which falls down also falls onto the conveyor 230 but generally falls between the members 240 at the spaces 242, and mainly, after passing through both runs of the conveyor 230, onto the ground over which the harvester is passing.

The walking bars 200, moved by their crankshaft 202 with the aid of the pitman 212, are set to translate according to the paths 222 at the forward end and 223 and 224 at the rear end. The tomatoes are therefore shaken off the vine with a gradually increasing action, and by the time they reach the end of the portions 201, the tomatoes have substantially all been shaken off the vine and have fallen onto the conveyor 230, as described. The absence of obstruction due to the positioning of the crankshaft 202 below the conveyor 230 and the use of the arms 209 and 210 to make this possible, the smooth transfer from the slide 141 to the bars 200 without any opportunity for the tomatoes to fall elsewhere than on the conveyor 230, all enhance operation at this point. The vines continue to move back, and having left all their tomatoes, move up the inclined portions 261 onto the terminal portions 262 and fall off the ends 260 and down onto the slide 225. From there, the vines drop out of the machine onto the ground, leaving each vine at approximately the same position where it was picked up.

The tomatoes are brought up the conveyor 230 along with some small leaves and plant bits, but also all the dire has already dropped off through the conveyor 230. As they reach the upper end of the conveyor 230, the tomatoes fall into the tilted rear cross conveyors 250 and 251 across the gap 253, while the blowers 254 send a strong current of air through them, carrying the plant debris, leaves, stems, and so on, up the slide 252 onto the slide 225. The blown current of air is guided by the shield structure 257 so that it goes down the slide and prevents any plant bits from drifting back onto the conveyors 251. The tomatoes, as they move out across the conveyors 250 and 251, are therefore substantially clean of plant debris.

The cross conveyors 250 and 251 then carry the tomatoes out to and deposit them gently on the sorting conveyors 270 and 271. The sorters, standing on the platforms 276, look at all the tomatoes carefully and throw the discards down into the discard chute 275. The sorted tomatoes then pass forward to the cross conveyor 280 at the front of the machine. Those from the conveyor 270 move all the way across the machine, are joined at the opposite side of the machine by the tomatoes from the sorting conveyor 271, and with them, are carried onto the output conveyor 46. The flight members 297 help to carry the tomatoes uphill, as shown in FIG. 3, over to the fruit depositing device 47. As the tomatoes gradually stack up in the bin, the conveyor 46 can be raised, the device 47 being usually at its lowest position at the commencement of operation so that the tomatoes will not have so far to drop. The driver of the vehicle pulling the bin 48 tries to adjust his speed to exactly that of the harvesting device, but if he fails to, the safety swing of the device 47 prevents damage to the device 47 and to the conveyor 46 by enabling the device 47 to swing on an angle temporarily until the speed is properly adjusted. The device 47 is adjusted to accommodate the proper size of tomatoes and to obtain the proper angle by means that have been described earlier.

When the operator comes to the end of a row, he actuates the hydraulic cylinder 65 to raise both the pickup unit 42 and the cutter unit 41. When he re-enters a row after having already harvested one row and therefore having obtained the proper cutting depth of the blade 50 and proper relation of the cutter unit 41 to the pickup unit 42, he operates a handle 129 to hydraulically lower the units 41 and 42.

The tomatoes are thus mechanically harvested with great efficiency and are moved from the growing vine to the bin 48 with only the sorting being carried out by hand and even that being considerably speeded up and improved by the machine.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a tomato harvesting machine having a main frame having a forward end, a rear end, and sides, means for moving said frame forwardly in a field, pickup means adjacent said forward end for picking up tomato plants from the field, with the tomatoes attached, and for carrying them rearwardly and upwardly, separating means on said frame extending rearwardly from adjacent the rear end of said pickup means, for separating ripe tomatoes off said plants, plant disposal means on the rear end of said frame behind said separating means for dropping the plants on the field after said tomatoes have been separated therefrom, and tomato-collecting means supported by said frame below said separating means for catching the separated tomatoes and moving said tomatoes upwardly and rearwardly, the combination therewith of:
two rear cross-conveyor means supported on said frame at the rear of said tomato-collecting means for sending tomatoes therefrom laterally to the two sides of said frame,
said tomato-collecting means extending to a point above said cross-conveyor means, and
blower means in the space between said tomato-collecting means and said cross-conveyor means for sending a current of air through that space to carry leaves and lightweight plant parts into said plant disposal means while said tomatoes drop onto said cross-conveyor means.

2. In a tomato harvesting machine havinga main frame having a forward end, a rear end, and sides, means for moving said frame forwardly in a field, pickup means adjacent said forward end for picking up tomato plants from the field, with the tomatoes attached, and for carrying them rearwardly and upwardly, separating means on said frame extending rearwardly from adjacent the rear end of said pickup means, for separating ripe tomatoes off said plants, plant disposal means on the rear end of said frame behind said separating means for dropping the plants on the field after said tomatoes have been separated therefrom, and tomato-collecting means supported by said frame below said separating means for catching the separated tomatoes and moving said tomatoes upwardly and rearwardly, the combination therewith of:
two rear cross-conveyor means supported on said frame at the rear of said tmoato-collecting means for sending tomatoes therefrom laterally to the two sides of said frame,
two sorting conveyor means, one supported lengthwise by each side of said frame for receiving tomatoes from one said cross-conveyor means and moving them forwardly along the sides of said frame to a point forward of said separating means and between the front and rear ends of said pickup means,
platform means supported by each side of said frame for holding sorters who inspect the tomatoes moving along said sorting conveyors,
front lateral conveyor means supported by said frame between the front and rear ends of said pickup means and above said pickup means for receiving tomatoes from both said sorting means and moving them in one direction to one side of said frame,
output conveyor means supported by and extending out laterally beyond said frame as an extension of said lateral conveyor means for receiving tomatoes from said lateral conveyor means and carrying them out beyond said frame for deposit in suitable containers,
the sorting conveyor means closer to said output conveyor means extending to about the rear edge of said lateral conveyor means, and
the other said sorter conveyor means extending to about midway between the front and rear edges of said lateral conveyor means.

3. In a tomato harvesting machine having a main frame having a forward end, a rear end, and sides, means for moving said frame forwardly in a field, pickup means on said frame having a forward end for picking up cut-off tomato plants from the field, with the tomatoes attached, in a vertical movement substantially without forward movement, and having a rear end, shaking means on said frame extending rearwardly from adjacent the rear end of said pickup means, for shaking the ripe tomatoes off said plants, plant disposal means on the rear end of said frame behind said shaking means for dropping the plants on the field after said tomatoes have been shaken off, and tomato-collecting means supported by said frame below said shaking means for catching said shaken-off tomatoes and moving said tomatoes upwardly and rearwardly, the combination thereof:
two rear cross-conveyor means supported widthwise on said frame at the rear of said tomato collecting means to receive tomatoes therefrom and for sending tomatoes therefrom laterally to the two sides of said frame,
said tomato-collecting means extending to a point above said cross conveyor means, and
blower means in the space between said tomato collecting means and said cross-conveyor means for sending a current of air through that space to carry away leaves and lightweight plant parts, while said tomatoes drop onto said cross-conveyor means.

4. In a tomato harvesting machine having a main frame having a forward end, a rear end, and sides, means for moving said frame forwardly in a field, pickup means on said frame having a forward end for picking up cut-off tomato plants from the field, with the tomatoes attached, in a vertical movement substantially without forward movement, and having a rear end, shaking means on said frame extending rearwardly from adjacent the rear end of said pickup means, for shaking the ripe tomatoes off said plants, plant disposal means on the rear end of said frame behind said shaking means for dropping the plants on the field after said tomatoes have been shaken off, and tomato-collecting means supported by said frame below said shaking means for catching said shaken-off tomatoes and moving said tomatoes upwardly and rearwardly, the combination therewith of:
two rear cross-conveyor means supported on said frame at the rear of said tomato collecting means for sending tomatoes therefrom laterally to the two sides of said frame,
sorting conveyor means supported lengthwise by each side of said frame for receiving tomatoes from said cross-conveyor means and moving them forwardly along the sides of said frame to a point forward of said shaker means and between the front and rear ends of said pickup means, each said sorter conveyor means comprising a frame confining a belt between two side means and a discard chute formed by a partition supported by said main frame and spaced between said sorter frame and said sorting platform, and
platform means supported by each side of said frame for holding sorters who inspect the tomatoes moving along each said sorting conveyor.

5. In a tomato harvesting machine having a main frame having a forward end, a rear end, and sides, means for moving said frame forwardly in a field, pickup means on said frame having a forward end for picking up cut-off tomato plants from the field, with the tomatoes attached, in a vertical movement substantially without forward movement, and having a rear end, shaking means on said frame extending rearwardly from adjacent the rear end of said pickup means, for shaking the ripe tomatoes off said plants, plant disposal means on the rear end of said frame behind said shaking means for dropping the plants on the field after said tomatoes have been shaken off, and tomato-collecting means supported by said frame below said shaking means for catching said shaken-off tomatoes and moving said tomatoes upwardly and rearwardly, the combination therewith of:
two rear cross-conveyor means supported on said frame at the rear of said tomato collecting means for sending tomatoes therefrom laterally to the two sides of said frame, and
sorting conveyor means supported lengthwise by each side of said frame for receiving tomatoes from said cross-conveyor means and moving them forwardly along the sides of said frame to a point forward of said shaker means and between the front and rear ends of said pickup means,
said cross-conveyor means comprises tilted conveyor belts and a partition extending angularly across each of them to sweep tomatoes onto said sorting conveyor means.

6. In a tomato harvesting machine having a main frame having a forward end, a rear end, and sides, means for moving said frame forwardly in a field, pickup means on said frame having a forward end for picking up cut-off tomato plants from the field, with the tomatoes attached, in a vertical movement substantially without forward movement, and having a rear end, shaking means on said frame extending rearwardly from adjacent the rear end of said pickup means, for shaking the ripe tomatoes off said plants, plant disposal means on the rear end of said frame behind said shaking means for dropping the plants on the field after said tomatoes have been shaken off, and tomato-collecting means supported by said frame below said shaking means for catching said shaken-off tomatoes and moving said tomatoes upwardly and rearwardly, the combination therewith of:
two rear cross-conveyor means supported on said frame at the rear of said tomato collecting means for sending tomatoes therefrom laterally to the two sides of said frame,
sorting conveyor means supported lengthwise by each side of said frame for receiving tomatoes from said cross-conveyor means and moving them forwardly along the sides of said frame to a point forward of said shaker means and between the front and rear ends of said pickup means,
platform means supported by each side of said frame for holding sorters who inspect the tomatoes moving along each said sorting conveyor,
front lateral conveyor means supported by said frame between the front and rear ends of said pickup means and above said pickup means for receiving tomatoes from both said sorting means and moving them in one direction to one side of said frame, one said sorting conveyor means extending only to the rear edge of said front lateral conveyor means and the other said sorting conveyor means extending to the center line thereof, and
output conveyor means extending out laterally beyond said frame as an extension of said lateral conveyor means and pivotally supported by said frame for receiving tomatoes from said lateral conveyor means out beyond said frame.

References Cited
UNITED STATES PATENTS

| | | | |
|---|---|---|---|
| 2,095,428 | 10/1937 | Batie | 171—17 X |
| 2,578,189 | 12/1951 | Johnston | 171—131 X |
| 2,896,728 | 7/1959 | Pridy | 171—130 |
| 3,078,926 | 2/1963 | Ries et al. | 171—14 |
| 3,106,249 | 10/1963 | Zachery | 171—14 |

ABRAHAM G. STONE, *Primary Examiner.*

ANTONIO F. GUIDA, *Examiner.*